United States Patent Office 3,682,777
Patented Aug. 8, 1972

3,682,777
PROCESS FOR PRODUCING PENICILLIN DERIVATIVES
Takashi Nara, Tokyo, Masanaru Misawa, Kawasaki-shi, and Ryo Okachi, Machida-shi, Japan, assignors to Kyowa Hakko Kogyo Co., Ltd., Tokyo, Japan
No Drawing. Filed Sept. 9, 1969, Ser. No. 856,480
Claims priority, application Japan, Sept. 18, 1968, 43/66,879; Oct. 8, 1968, 43/72,874
Int. Cl. C12d 9/00
U.S. Cl. 195—36 P          23 Claims

ABSTRACT OF THE DISCLOSURE

α-Aminobenzyl penicillin or p-aminobenzyl penicillin is produced by an enzymatic reaction. A pencillin or 6-amino-penicillanic acid is reacted with α-aminophenyl acetate or p-aminophenyl acetate, or a derivative thereof, in the presence of an enzyme obtained by culturing a microorganism of the genus Pseudomonas, Arthrobacter, Corynebacterium, Micrococcus, Brevibacterium, Mycobacterium, Nocardia, Kluyvera, Rhodopseudomonas or Streptomyces under aerobic conditions in a suitable nutrient medium.

---

This invention relates to a process for producing penicillin derivatives. More particularly, it relates to a process for the production of α-aminobenzyl penicillin or p-aminobenzyl pencillin. Even more particularly, the invention relates to a process for producing α-aminobenzyl penicillin or p-aminobenzyl penicillin by an enzymatic reaction.

The compounds produced by the invention, α-aminobenzyl penicillin and p-aminobenzyl penicillin, are compounds having utility in the medical field. Hence, new ways of producing such compounds are constantly being sought by the art.

One of the objects of the present invention is to provide a process for the production of α-aminobenzyl penicillin and p-aminobenzyl penicillin.

Another object of the present invention is to provide a process for producing said penicillin derivatives which may be carried out in an efficacious and relatively simple manner.

A further object of the invention is to provide a process for producing said penicillin derivatives by means of an enzymatic reaction which may be carried out advantageously on a large scale, if desired, to give a high yield of product.

A still further object of the invention is to provide α-aminobenzyl penicillin or p-aminobenzyl penicillin.

These and other objects and advantages of the present invention will become apparent to those skilled in the art from a consideration of the following specification and claims.

In accordance with the present invention, α-aminobenzyl penicillin is produced by the use of cultured liquors of certain microorganisms, cells thereof or enzymatic solutions extracted therefrom using 6-amino-penicillanic acid (hereinafter abbreviated to 6APA or a penicillin and α-aminophenyl acetate or derivatives thereof. Correspondingly, p-aminobenzyl penicillin is obtained from 6APA or a penicillin derivative and p-aminophenyl acetate or a derivative thereof.

The production of α-aminobenzyl penicillin and p-aminobenzyl penicillin from 6APA or another penicillin derivative and α- or p-aminophenyl acetate is carried out in accordance with the invention using cultured liquors, cells or enzymatic solutions obtained from a microorganism belonging to a genus selected from the group consisting of Pseudomonas, Arthrobacter, Corynebacterium, Brevibacterium, Micrococcus, Mycobacterium, Nocardia, Kluyvera, Rhodopseudomonas, Streptomyces and the like. Specific bacteria belonging to the above-mentioned genera employed in the present invention are characterized in having a remarkably strong enzymatic activity for producing α-aminobenzyl penicillin or p-aminobenzyl penicillin from 6APA (or a penicillin) and α-aminophenyl acetates or p-aminophenyl acetates, respectively.

The action of the present enzymes is generally shown for illustrative purposes in the following reaction schemes.

(1) PRODUCTION OF α-AMINOBENZYL PENICILLIN

When 6APA is used as a substrate:

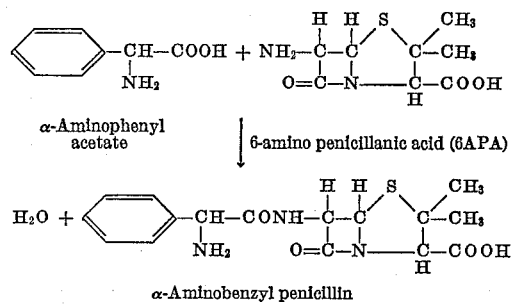

When penicillin G is used as a substrate:

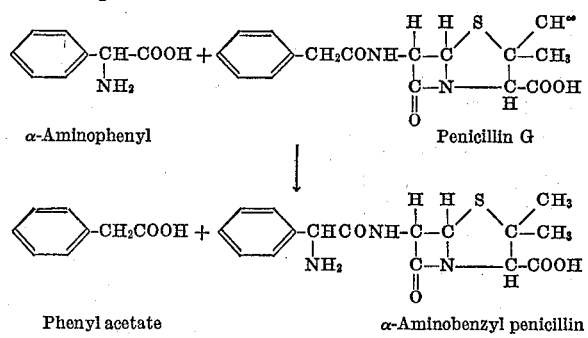

(2) PRODUCTION OF P-AMINOBENZYL PENICILLIN

When 6APA is used as a substrate:

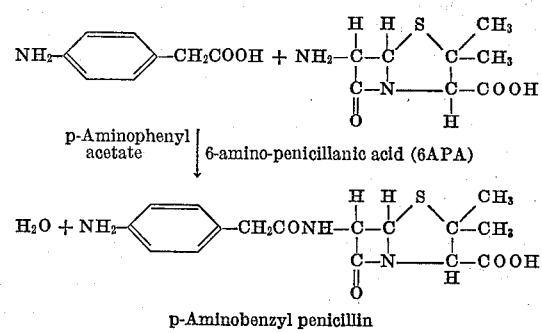

When penicillin G is used as a substrate:

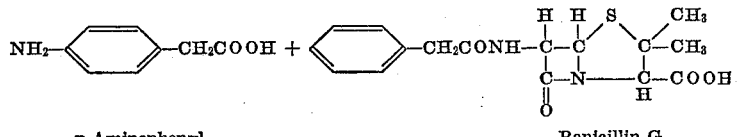

p-Aminophenyl acetate      Penicillin G

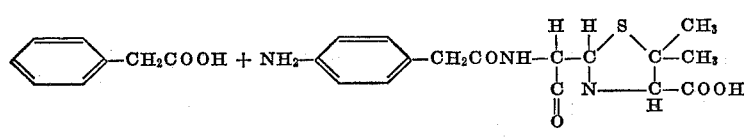

Phenylacetate      p-Aminobenzyl penicillin

Other preferred microorganisms which can also be employed in the present invention are hydrocarbon-assimilating microorganisms belonging to the genera Pseudomonas, Arthrobacter, Corynebacterium, Brevibacterium, Micrococcus, Mycobacterium, Nocardia, Kluyvera, Rhodopseudomas, Streptomyces and the like. Mutant strains having the enzymatic activity necessary for effecting the process of the present invention may also be employed. Mutants with such a strong enzymatic action are obtained by effecting a genetic mutation with, for example, ultraviolet-ray treatments, X-ray irradiation, chemical mutation agents, etc.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, saccharine materials such as glucose, fructose, maltose, sucrose, starch, starch hydrolysate, molasses, sorbitol, etc., or any other suitable carbon sources such as organic acids, for example, acetic acid, lactic acid, etc. These substances may be used either singly or in mixtures of two or more. In the case of using hydrocarbon-assimilating microorganisms, hydrocarbons, for example, n-paraffins, petroleum crudes, kerosene, light oils, heavy oils and the like may be used in the nutrient medium as the sole or as the major source of carbon.

As a nitrogen source, various kinds of inorganic or organic salts or compounds, such as urea, liquid ammonia or ammonium salts such as ammoniun chloride, ammonium sulfate, ammonium nitrate, ammonium acetate, ammonium phosphate, etc., or natural substances containing nitrogen, such as corn steep liquor, yeast extract, meat extract, peptone, fish meal, bouillon, casein hydrolysates, casamino acid, fish solubles, rice bran extract, etc. may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

Culturing is conducted under aerobic conditions, such as aerobic shaking of the culture or with stirring and aeration of a submerged culture, at a temperature of, for example, about 20° to 50° C. and at a pH of, for example, about 5.0 to 9.0. Culturing is generally carried out for approximately 1 to 7 days. The enzymes necessary for effecting the reactions of the present invention are synthesized in the cells of the microorganisms and in the culture liquor itself.

The enzyme may be supplied to the starting materials either in the form of the cultured liquor itself, the microorganism cells, the cultured liquor obtained after removing the microorganism cells therefrom or as an enzyme solution obtained by purifying said substances according to conventional methods such as salting out by ammonium sulfate, dialysis, precipitation by acetone or ethanol, column chromatography and the like. Microorganism cells, if used, are employed per se, as suspensions thereof or as dried cells (drying can be effected with acetone). When a cultured liquor itself is used, the substrate penicillin is added to the cultured liquor as is, and the reaction is carried out after the adjustment of the pH to, for example, 6.5–7.0.

As noted above, 6APA or penicillins such as penicillin G, penicillin V and the like are used as the substrate. They are ordinarily used in the form of their potassium or sodium salt. As the other substrate starting material, potassium or sodium salts of α-aminophenyl acetate or p-aminophenyl acetate, respectively, are employed. Derivatives thereof, such as the amide, methyl ester, ethyl ester, thioglycolic acid ester or hydrochloride, may be used.

Generally, the reaction is conducted in a reaction solution prepared by adding the two substrates and adequate amounts of enzyme materials to a buffer solution having a definite pH or in a fermentation liquor as mentioned above prepared by adding the two substrates thereto. The reaction may be conducted within a wide pH range, for example, from 3 to 8. An optimum pH for the present reaction is 5.5–7.5, preferably 6.5–7.3. The reaction is carried out at 25°–50° C., preferably 35°–38° C., for 1–24 hours.

The α-aminobenzyl penicillin or p-aminobenzyl penicillin obtained after the completion of the reaction is easily isolated according to conventional methods. Advantageously, these compounds are recovered by combining a transfer extraction procedure or a precipitation by means of organic solvents, with isoelectric point-precipitation, ion exchange resin treatment, a column chromatographic method or the like.

The following examples are given merely as illustrative of the present invention and are not to be considered as limiting. Unless otherwise noted, the percentages therein and throughout the application are by weight per liter of water.

Example 1

Pseudomonas sp. ATCC 21284 is employed as the seed microorganism. A platium loop of the seed microorganism is inoculated into a 250 ml.-Erlenmeyer flask containing 20 ml. of a seed culture comprising 1% peptone, 1% meat extract, 0.5% yeast extract and 0.3% sodium chloride. Culturing is carried out with aerobic shaking at 30° C. for 24 hours. Two ml. of the resultant seed culture liquor is inoculated into a 250 ml.-Erlenmeyer flask containing 20 ml. of a fermentation medium having the following composition:

| | Percent |
|---|---|
| Peptone | 0.5 |
| Yeast extract | 0.5 |
| Cornsteep liquor | 2.5 |
| Sodium chloride | 0.3 |
| Sodium L-glutamate | 0.5 |

The pH of the medium before sterilization is 7.3. The pH is adjusted with 5 N—NaOH.

After culturing has been carried out for 48 hours with aerobic shaking at 30° C., the obtained microorganism cells are separated from the fermentation liquor by centrifugal precipitation and then are washed twice with 0.9% sodium chloride. Thereafter, the cells are suspended in a 1/30 M-phosphate buffer having a pH of 6.8 in an amount of 10 mg./ml. as dried cells. 6-amino-penicillanic acid and potassium α-aminophenyl acetate are added thereto in amounts of 1.5 mg./ml. and 10 mg./ml., respectively. Thereafter, the reaction solution is permitted to react at 37° C. for 40 hours.

The amount of α-aminobenzyl penicillin produced in the reaction solution is 1.53 mg./ml.

Example 2

*Kluyvera citrophila* ATCC 21285 is used as the seed microorganism. The culturing conditions are the same as described in Example 1, with the exception that 0.2% of ammonium phenyl acetate is added to the main fermentation medium. The microorganism cells obtained after 48 hours of culturing are reacted in the same manner as described in Example 1, except that an additional quantity of 0.6 mg./ml. of 6-amino-penicillanic acid is added to the reaction solution three hours after the beginning of the reaction. The reaction is continued for one hour after the addition of the 6APA. The amount of α-aminobenzyl penicillin produced in the resultant reaction solution is 2.38 mg./ml.

Example 3

The same seed microorganism and culturing conditions as described in Example 2 are employed. However, 3 mg./ml. of penicillin G potassium salt is added to the reaction solution of Example 1 instead of 6-amino-penicillanic acid. Also, 10 mg./ml. of α-aminophenyl acetate amide is added to the reaction solution instead of potassium α-aminophenyl acetate. Otherwise, the reaction conditions are the same as in Example 1. After 5 hours of reaction, the amount of α-aminobenzyl penicillin produced in the reaction solution is 2.52 mg./ml.

Example 4

*Rhodopseudomonas spheroides* ATCC 21286 and *Micrococcus ureae* ATCC 21288 are used as the seed microorganisms. The conditions of culturing are the same as described in Example 1. After 48 hours of culturing, 6-amino-penicillanic acid and α-aminophenyl acetate ethyl ester are added to the fermentation liquor itself in amounts of 1.5 mg./ml. and 10 mg./ml., respectively, without recovering the microorganism cells. The pH of the fermentation liquor is adjusted to 7.1, and culturing is continued.

During the cultivation, the pH of the fermentation liquor is adjusted to 7.1 with hydrochloric acid or sodium hydroxide, as required, every thirty minutes. The amount of α-aminobenzyl penicillin accumulated in the resultant fermentation liquor after 5 hours of reaction with the substrates is 1.20 mg./ml. in the case of *Rhodopseudomonas spheroides* and 1.08 mg./ml. in the case of *Micrococcus ureae*.

Example 5

*Streptomyces phaeochromogenes* ATCC 21289 and *Nocardia globerula* ATCC 21292 are used as the seed strains. A fermentation medium having the following composition is employed:

| | Percent |
|---|---|
| Soluble starch | 3 |
| Soybean powder | 2 |
| Sodium chloride | 0.2 |
| Yeast extract | 0.5 |
| Peptone | 0.5 |

The medium has a pH of 7.3 before sterilization. The other conditions of culturing are the same as described in Example 1.

After 4 days of culturing, 25 mg./ml. of penicillin V in the case of *Streptomyces phaeochromogenes* and 25 mg./ml. of penicillin G in the case of *Nocardia globerula* together with 10 mg./ml. of α-aminophenyl acetate methyl ester are added to the fermentation liquor. The pH of the fermentation liquor is adjusted to 6.8, and culturing is continued. During the cultivation, the pH of the fermentation liquor is adjusted to 6.8 with hydrochloric acid or sodium hydroxide every 30 minutes. The amount of α-aminobenzyl penicillin accumulated in the fermentation liquor six hours after the addition of substrate to *Streptomyces phaeochromogenes* is 1.27 mg./ml.; in the case of *Nocardia globerula*, 2.04 mg./ml. of α-aminobenzyl penicillin is accumulated in the fermentation liquor.

Example 6

*Pseudomonas aeruginosa* ATCC 15246 is employed as the seed microorganism. The seed culture medium contains 1% peptone, 1% meat extract, 0.5% yeast extract and 0.25% sodium chloride. A platinum loop of the seed microorganism is inoculated into a 250 ml.-Erlenmeyer flask containing 20 ml. of the seed medium, and seed-culturing is conducted with aerobic shaking at 30° C. for 24 hours. Two ml. of the resultant seed culture liquor is inoculated into a 250 ml.-Erlenmeyer flask containing 20 ml. of a fermentation medium having the following composition:

| | Percent |
|---|---|
| n-Paraffin mixture (a mixture of equivalent amounts of $C_{11}$–$C_{14}$ n-paraffins) | 5 |
| Phenyl acetate | 0.3 |
| $(NH_4)_2SO_4$ | 2 |
| $KH_2PO_4$ | 0.15 |
| $MgSO_4 \cdot 7H_2O$ | 0.05 |
| $MnSO_4 \cdot 4H_2O$ | 0.001 |
| $FeSO_4 \cdot 7H_2O$ | 0.01 |
| Yeast extract | 0.5 |
| Cornsteep liquor | 0.2 |
| $CaCO_3$ | 2 |

The pH of the medium is 7.3 before sterilization.

After culturing is carried out for 72 hours at 30° C. with aerobic shaking of the culture, the microorganism cells are separated from the fermentation liquor by centrifugation, washed with 0.9% sodium chloride twice and, then, suspended in 1/30 M-phosphate buffer having a pH of 6.9 in an amount of 8 mg./ml. (calculated as dried cells). Then, 25 mg./ml. of 6-amino-penicillanic acid and 10 mg./ml. of α-aminophenyl acetate methyl ester are added to the solution. The reaction is allowed to proceed at 37° C. for 5 hours. The amount of α-aminobenzyl penicillin produced in the resultant reaction solution is 3.05 mg./ml.

Example 7

*Brevibacterium cerinus* ATCC 15112 is used as the seed microorganism. The conditions of culturing are the same as described in Example 6. To the reaction solution is added 10 mg./ml. of p-aminophenyl acetate amide, instead of α-aminophenyl acetate methyl ester. The other reaction conditions, however, are the same as in Example 6. After 4 hours of reaction, the amount of p-aminobenzyl penicillin produced in the reaction solution is 3.82 mg./ml.

Example 8

*Arthrobacter simplex* ATCC 15799 is used as the seed microorganism. The same fermentation medium as that set forth in Example 6 is used, except that 7% of kerosene is substituted for the n-paraffin mixture and the phenyl acetate is omitted. The other conditions of culturing are the same as in Example 6. However, after 72 hours of culturing, 2 mg./ml. of 6-amino-penicillanic acid and 10 mg./ml. of α-aminophenyl acetate amide are added to the fermentation liquor itself without recovering the cells therefrom. The pH of the fermentation liquor is adjusted to 6.5, and culturing is continued. During the cultivation, the pH of the fermentation liquor is adjusted with hydrochloric acid or sodium hydroxide, as necessary, every 30 minutes. Six hours after the addition of the substrates, the production amount of α-aminobenzyl penicillin accumulated in the fermentation liquor is 2.75 mg./ml.

Example 9

*Corynebacterium fascians* ATCC 12975 is used as the seed strain. The conditions of culturing are the same as described in Example 6. A reaction solution is prepared by adding 3 mg./ml. of penicillin G potassium salt, instead of 6-amino-penicillanic acid, to the reaction solution of Example 1. The other reaction conditions are the same as in Example 6. After the reaction has proceeded for 5 hours, 1.86 mg./ml. of α-aminobenzyl penicillin is found to be produced in the reaction solution.

Example 10

Three different strains, *Micrococcus ureae* ATCC 21288, *Mycobacterium smegmatis* ATCC 21293 and *Nocardia globerula* ATCC 21022, are used as the seed microorganisms. A culture medium prepared by eliminating phenyl acetate from the medium of Example 6 is employed as the main fermentation medium. The other conditions of culturing are the same as described in Example 6. However, after 72 hours of culturing, penicillin G potassium salt and p-aminophenyl acetate ethyl ester are added to the fermentation liquor itself in amounts of 4 mg./ml. and 15 mg./ml., respectively, without recovering the microorganism cells from the liquor. The pH of the fermentation liquor is adjusted to 5.8, and culturing is continued. During the cultivation, the pH of the fermentation liquor is adjusted to 5.8 with hydrochloric acid or sodium hydroxide, as needed. The pH is adjusted to 7.2 after culturing has continued for three hours after the addition of the substrates. Then, the cultivation is continued while adjusting the pH to 7.2 every 30 minutes. The amounts of p-aminobenzyl penicillin accumulated in the resultant reaction solution are shown in Table 1.

TABLE 1

| Microorganism strain: | Amount of p-aminobenzyl penicillin produced (mg./ml.) |
|---|---|
| *Micrococcus ureae* ATCC 21288 | 2.37 |
| *Mycobacterium smegmatis* ATCC 21293 | 3.09 |
| *Nocardia globerula* ATCC 21022 | 2.75 |

The invention being thus described, it will be obvious that the same may be varied in many ways. Such inventions are not to be regarded as a departure from the spirit and scope of the invention, and all such modifications as would be obvious to one skilled in the art are intended to be included herein.

We claim:

1. A process for producing α-aminobenzyl penicillin or p-aminobenzyl penicillin which comprises reacting 6-amino-penicillanic acid or a penicillin with an α-aminophenyl acetate, in the case of the α-aminobenzyl penicillin, or a p-aminophenyl acetate, in the case of the p-aminobenzyl penicillin, in the presence of an enzyme obtained by culturing a microorganism selected from the group consisting of Pseudomonas sp. ATCC 21284, *Kluyvera citrophila*, *Rhodopseudomonas spheroides*, *Micrococcus ureae*, *Streptomyces phaeochromogenes*, *Nocardia globerula*, *Pseudomonas aeruginosa* ATCC 15246, *Brevibacterium cerinus*, *Arthrobacter simplex*, *Corynebacterium fascians* ATCC 12975 and *Mycobacterium smegmatis* under aerobic conditions in an aqueous nutrient medium, and recovering said α-aminobenzyl penicillin or p-aminobenzyl penicillin from the resultant reaction solution.

2. The process of claim 1, wherein said microorganism is hydrocarbon-assimilating and said nutrient medium contains at least one hydrocarbon as the main source of carbon.

3. The process of claim 1, wherein the reaction is carried out at a pH of approximately 3 to 8.

4. The process of claim 3, wherein the reaction is carried out at a temperature of approximately 25° to 50° C.

5. The process of claim 1, wherein the reaction is carried out at a pH of 5.5 to 7.5.

6. The process of claim 5, wherein the reaction is carried out at a temperature of 35° to 38° C.

7. The process of claim 1, wherein the penicillin reactant is selected from the group consisting of penicillin G, penicillin V and the sodium and potassium salts thereof.

8. The process of claim 1, wherein the α-aminophenyl acetate reactant is selected from the group consisting of the amide, methyl ester, ethyl ester, thioglycolic acid ester, hydrochloride, potassium salt and sodium salt thereof.

9. The process of claim 1, wherein the p-aminophenyl acetate reactant is selected from the group consisting of the amide, methyl ester, ethyl ester, thioglycolic acid ester, hydrochloride, potassium salt and sodium salt thereof.

10. A process for producing α-aminobenzyl penicillin or p-aminobenzyl penicillin which comprises reacting 6-amino-penicillanic acid or a penicillin with an α-aminophenyl acetate, in the case of the α-aminobenzyl penicillin, or a p-aminophenyl acetate, in the case of the p-aminobenzyl penicillin, at a temperature of approximately 25° to 50° C. and at a pH of approximately 3 to 8, in the presence of an enzyme obtained by culturing a microorganism selected from the group consisting of Pseudomonas sp. ATCC 21284, *Kluyvera citrophila*, *Rhodopseudomonas spheroides*, *Micrococcus ureae*, *Streptomyces phaeochromogenes*, *Nocardia globerula*, *Pseudomonas aeruginosa* ATCC 15246, *Brevibacterium cerinus*, *Arthrobacter simplex*, *Corynebacterium fascians* ATCC 12975 and *Mycobacterium smegmatis* under aerobic conditions in an aqueous nutrient medium at a temperature of about 20° to 50° C. and at a pH of about 5.0 to 9.0, and recovering said α-aminobenzyl penicillin or p-aminobenzyl penicillin from the resultant reaction solution.

11. The process of claim 10, wherein said microorganism is hydrocarbon-assimilating and said nutrient medium contains at least one hydrocarbon as the main source of carbon.

12. The process of claim 10, wherein said microorganism is Pseudomonas sp. ATCC 21284.

13. The process of claim 10, wherein said microorganism is *Kluyvera citrophila* ATCC 21285.

14. The process of claim 10, wherein said microorganism is *Rhodopseudomonas spheroides* ATCC 21286.

15. The process of claim 10, wherein said microorganism is *Micrococcus ureae* ATCC 21288.

16. The process of claim 10, wherein said microorganism is *Streptomyces phaeochromogenes* ATCC 21289.

17. The process of claim 10, wherein said microorganism is *Nocardia globerula* ATCC 21292.

18. The process of claim 11, wherein said microorganism is *Pseudomonas aeruginosa* ATCC 15246.

19. The process of claim 11, wherein said microorganism is *Brevibacterium cerinus* ATCC 15112.

20. The process of claim 11, wherein said microorganism is *Arthrobacter simplex* ATCC 15799.

21. The process of claim 11, wherein said microorganism is *Corynebacterium fascians* ATCC 12975.

22. The process of claim 11, wherein said microorganism is *Mycobacterium smegmatis* ATCC 21293.

23. The process of claim 11, wherein said microorganism is *Nocardia globerula* ATCC 21022.

References Cited

UNITED STATES PATENTS

| | | | |
|---|---|---|---|
| 3,079,305 | 2/1963 | Kaufmann et al. | 195—36 P |
| 3,079,306 | 2/1963 | Offe et al. | 195—36 P |
| 3,079,307 | 2/1963 | Kaufmann et al. | 195—36 P |
| 3,121,667 | 2/1964 | Platt et al. | 195—36 P |
| 3,239,427 | 3/1966 | Huang et al. | 195—36 P |
| 3,239,428 | 3/1966 | Toyokawa et al. | 195—36 P |
| 3,390,054 | 6/1968 | Morinara | 195—66 |

ALVIN E. TANENHOLTZ, Primary Examiner